US007656878B2

(12) United States Patent
Caballero-McCann et al.

(10) Patent No.: US 7,656,878 B2
(45) Date of Patent: Feb. 2, 2010

(54) SYSTEM AND METHOD FOR PROVIDING ENHANCED CALLER ID IN A SESSION INITIATION PROTOCOL (SIP) ENVIRONMENT

(75) Inventors: Denise G. Caballero-McCann, Raleigh, NC (US); Stephen Levy, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 746 days.

(21) Appl. No.: 11/003,200

(22) Filed: Dec. 3, 2004

(65) Prior Publication Data

US 2006/0120377 A1   Jun. 8, 2006

(51) Int. Cl.
*H04L 12/28* (2006.01)
(52) U.S. Cl. ............... 370/395.2; 370/352; 379/142.06
(58) Field of Classification Search .................. None
See application file for complete search history.

(56) References Cited

U.S. PATENT DOCUMENTS

| | | | | |
|---|---|---|---|---|
| 3,963,874 | A | 6/1976 | Pommerening et al. | 179/18 |
| 4,809,321 | A | 2/1989 | Morganstein et al. | 379/211 |
| 5,771,283 | A * | 6/1998 | Chang et al. | 379/142.01 |
| 6,269,159 | B1 * | 7/2001 | Cannon et al. | 379/202.01 |
| 6,501,750 | B1 | 12/2002 | Shaffer et al. | 370/353 |
| 6,510,162 | B1 | 1/2003 | Fijolek et al. | 370/432 |
| 6,546,087 | B2 | 4/2003 | Shaffer et al. | 379/90.01 |
| 6,567,505 | B1 | 5/2003 | Omori et al. | 379/84 |
| 6,601,099 | B1 | 7/2003 | Corneliussen | 709/224 |
| 6,614,899 | B1 | 9/2003 | Sollee et al. | 379/218.01 |
| 6,615,236 | B2 | 9/2003 | Donovan et al. | 709/203 |
| 6,625,141 | B1 | 9/2003 | Glitho et al. | 370/352 |
| 6,636,594 | B1 | 10/2003 | Oran | 379/201.01 |
| 6,658,095 | B1 | 12/2003 | Yoakum et al. | 379/93.01 |
| 6,661,799 | B1 | 12/2003 | Molitor | 370/401 |
| 6,665,723 | B2 | 12/2003 | Trossen | 709/227 |
| 6,678,735 | B1 | 1/2004 | Orton et al. | 709/230 |
| 6,684,147 | B2 | 1/2004 | Park et al. | 701/71 |
| 6,731,625 | B1 | 5/2004 | Eastep et al. | 370/352 |
| 6,738,390 | B1 | 5/2004 | Xu et al. | 370/467 |
| 6,744,868 | B2 * | 6/2004 | Mani | 379/201.02 |
| 6,754,181 | B1 | 6/2004 | Elliott et al. | 370/252 |
| 6,760,322 | B1 | 7/2004 | Fukuda et al. | 370/352 |
| 6,785,246 | B2 | 8/2004 | Foti | 370/261 |
| 6,788,676 | B2 | 9/2004 | Partanen et al. | 370/352 |

(Continued)

OTHER PUBLICATIONS

R. Mahy, et al., "The Session Initiation Protocol (SIP) 'Join' Header," The Internet Society, RFC 3991, http://www.ietf.org/rfc/rfc3911.txt, 15 pages, Oct. 2004.

(Continued)

*Primary Examiner*—Michael J Moore, Jr.
(74) *Attorney, Agent, or Firm*—Baker Botts L.L.P.

(57) ABSTRACT

A method for facilitating a data session in an initiation protocol (SIP) environment is provided that includes receiving a solicitation for participation in a SIP communication session that involves a first endpoint and a second endpoint. The method also includes identifying an identity trait associated with the first endpoint. In more particular embodiments, various alternative methods may include generating a network search associated with the first endpoint that is seeking to contact the second endpoint in order to conduct the SIP communication session. The results of the network search may be displayed for the second endpoint.

22 Claims, 3 Drawing Sheets

U.S. PATENT DOCUMENTS

| | | | | |
|---|---|---|---|---|
| 7,035,923 | B1* | 4/2006 | Yoakum et al. | 709/224 |
| 7,200,215 | B2* | 4/2007 | Brown et al. | 379/210.01 |
| 7,269,249 | B2* | 9/2007 | Woodring | 379/93.17 |
| 7,525,955 | B2* | 4/2009 | Velez-Rivera et al. | 370/352 |
| 2003/0133553 | A1* | 7/2003 | Khakoo et al. | 379/142.01 |
| 2005/0100150 | A1* | 5/2005 | Dhara et al. | 379/142.01 |
| 2006/0007954 | A1 | 1/2006 | Agrawal et al. | 370/466 |
| 2006/0074760 | A1* | 4/2006 | Helin et al. | 705/26 |

OTHER PUBLICATIONS

R. Mahy, et al., "The Session Initiation Protocol (SIP) 'Replaces' Header," The Internet Society, RFC 3891, http://www.ieff.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

R. Mahy et al., "Remote Call Control in SIP using the REFER method and the session-oriented dialog package," Internet Draft (no longer posted on Internet), The Internet Society, 35 pages, Feb. 2004.

R. Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pages, Mar. 5, 2006.

H. Schulzrinne and C.Agboh, "Session Initiation Protocol (SIP)-H. 323 Interworking Requirements," RFC 4123, 15 pages, Jul. 2005.

J. Rosenberg and H. Schulzrinne, "An Offer/Answer Model with the Session Description Protocol (SDP)," RFC 3264, 24 pages, Jun. 2002.

J. Rosenberg, H. Schulzrinne, and P.Kyzivat, "Caller Preferences for the Session Initiation Protocol (SIP)," RFC 3841, 25 pages, Aug. 2004.

H. Schulzrinne and S. Petrack, "RTP Payload of DTMF Digits, Telephony Tones and Telephony Signals," RFC 2833, 27 pages, May 2000.

A.B. Roach, "Session Initiation Protocol (SIP)-Specific Event Notification," RFC 3265, 34 pages, Jun. 2005.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

* cited by examiner

SYSTEM AND METHOD FOR PROVIDING ENHANCED CALLER ID IN A SESSION INITIATION PROTOCOL (SIP) ENVIRONMENT

TECHNICAL FIELD OF THE INVENTION

This invention relates generally to communications and, more particularly, to a system and a method and for providing an enhanced caller ID feature in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, one problem often encountered by a caller in any communications environment is being unable to identify characteristics about a calling party associated with the incoming call. This inability prohibits a receiving party from adequately preparing for the call, rejecting the call in cases where receiving the call from a specific individual is not preferred, or properly anticipating the needs of the calling party. Accordingly, this deficiency in information for the receiving party presents a burden for any employee, employer, individual, or endpoint that seeks to execute a successful and productive communication session.

SUMMARY OF THE INVENTION

From the foregoing, it may be appreciated by those skilled in the art that a need has arisen for an improved process that provides an effective solution for participants in a communications architecture. In accordance with an embodiment of the present invention, a system and a method for providing an enhanced caller ID functionality are provided that substantially eliminate or greatly reduce disadvantages and problems associated with conventional communication strategies and protocols.

According to an embodiment of the present invention, a method for facilitating a data session in an initiation protocol (SIP) environment is provided that includes receiving a solicitation for participation in a SIP communication session that involves a first endpoint and a second endpoint. The method also includes identifying an identity trait associated with the first endpoint.

In more particular embodiments, various alternative methods may include generating a network search associated with the first endpoint that is seeking to contact the second endpoint in order to conduct the SIP communication session. The results of the network search may be displayed for the second endpoint.

In still other embodiments, the method may include querying a directory for an additional identity trait associated with the first endpoint and providing an introductory message associated with the first endpoint for the second endpoint. The introductory message comprises a selected one of a WAV file, an audio message, a video message, and a text message.

Certain embodiments of the present invention may provide a number of technical advantages. For example, according to one embodiment of the present invention, an architecture and a process are provided that avoids time-consuming endeavors that inhibit productivity. Hence, in simplistic scenarios, the enhanced caller ID capability could allow a receiving party to: ignore the call, prioritize the call, prepare to take the call, respond to the call in some other fashion (for example using Instant Messaging), or perform any other appropriate action as determined by the receiving party. The individual, who is on the receiving end of this call, has the option to elect from any number of suitable responses. The receiving entity is knowledgeable about the incoming call and its associated calling party. This allows for the subsequent interaction between these parties to be most productive. Moreover, the applications of such an enhanced caller ID tool are virtually limitless.

Also, a higher number of successful calls are completed using the enhanced caller ID feature, which vastly improves efficiency parameters (particularly in the workplace). Furthermore, such a protocol may be performed with minimal individual effort from either the sender or the receiver of the information, as the enhanced caller ID feature may be performed autonomously. This would allow high-quality data to be quickly obtained and clearly displayed in the context of any SIP session. This could further augment the communication process.

In addition, such an architecture can readily be extended to conference call scenarios involving multiple requested participants. The present invention provides exceptional flexibility in its applications. Moreover, because SIP can operate as a network-based platform, simple Google searches could be executed for participants in the call. Therefore, a receiving party could be made aware of the directory information for a given individual, as well as be informed of the results from a simple search engine query. Other network queries could also be readily accommodated by the present invention.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
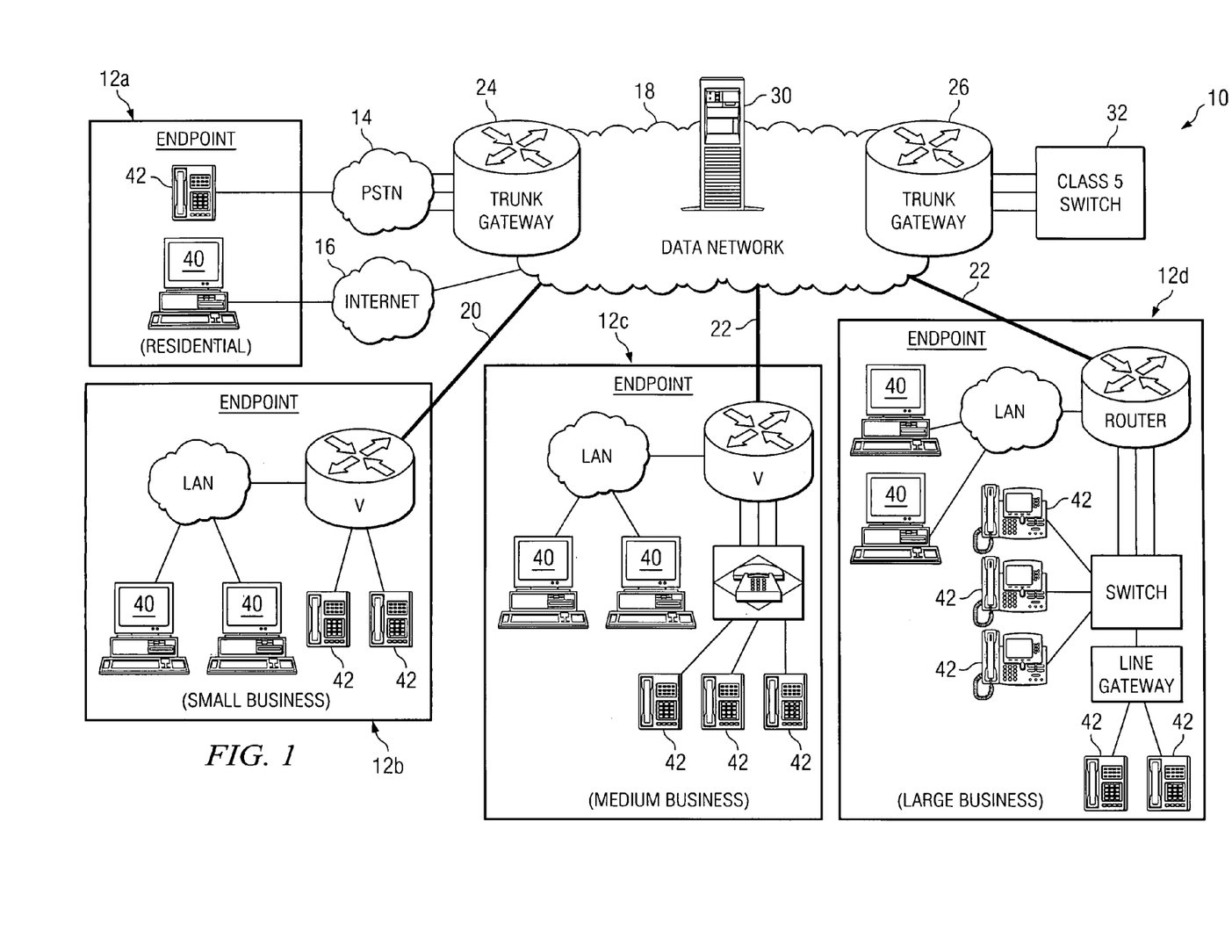
FIG. 1 is a simplified block diagram illustrating a communication system that may implement an enhanced caller ID feature in accordance with one embodiment of the present invention.

FIG. 1 is a simplified block diagram of a communication system 10 for communicating, receiving, and transmitting data in a session initiation protocol (SIP) environment. Communication system 10 includes endpoints 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Endpoint 12b represents a small business entity, which consists of a local area network (LAN), a router, several computers 40, and several telephones 42. Endpoint 12c represents a medium business entity, which consists of a LAN, router, a private branch exchange (PBX) or key system, several computers 40, and several telephones 42. Endpoint 12d is a large business entity, which consists of a LAN, a router, a switch, a line gateway, several computers 40, and several telephones 42.

In accordance with the teachings of the present invention, communication system 10 offers a new caller ID technology service that allows for an effective identification (and enhanced data-retrieval mechanism) to facilitate an optimal call session for a receiving party. In the traditional telephony environment, the caller ID is provided by text information with the caller's telephone number and/or the actual name of the calling entity. With the integration of SIP into a VoIP solution, alternative information (associated with the caller) may be provided to the called party using IP-based technology.

When a caller has placed a call, the called party's device (e.g. an IP telephone) can invoke a web browser and/or a presence-enabled SIP client in order to provide unique information about the caller. SIP, as a technology platform enables this in two ways. First, this is enabled by allowing web links to be included in the actual call set-up message (e.g. an Invite) so that a directory can be queried to determine any supplemental information about the caller, which is subsequently provided to the called party. Using the corporate directory as an example, the called party may be informed of the caller's position in the organization, the caller's method of contact other than phone number (e.g., Instant Message, alias, etc.), and the identity of the caller (e.g. via a picture of the caller and even an optional voice or video greeting from the caller).

Second, the SIP technology supports a presence capability to query for the caller's presence. This would provide a presence availability status for the caller, location information, device information, as well as any personal presence status that the caller wishes to communicate to the called party. Hence, communication system 10 builds on the traditional caller ID capabilities and extends it to provide enhanced information to the called party. This can be achieved using VoIP, specifically SIP in particular embodiments. SIP allows for the indication that the enhanced information is available and, further offers a mechanism to collect the information. In the context of presence-unique information, the SIP technology provides specific information to the called party. Communication system 10 offers unique and diverse protocols to inform the called party of caller information, to collect caller information, and to display caller information. In order to further explain and detail these operations and others, a number of additional examples are provided herein in this document and discussed below with reference to FIGS. 2-3.

Endpoints 12a-d are SIP-compatible elements that include hardware and/or software that is operable to receive and to transmit data (directly or indirectly) and to implement the enhanced caller ID feature as outlined herein. Note that the term "endpoint" encompasses a myriad of potential devices and infrastructure that may benefit from the operations of communication system 10. Endpoints 12a-d may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

Note that the term "endpoint" may also encompass a "persona." Entities that participate in call each generally have a persona. The persona represents an aggregation of the various devices and/or logical addresses that can be used by a person to communicate with another. For example, the persona of an employee named Denise could be represented by her phone number, her fully qualified domain name, her e-mail address, and/or the IP address port of her Instant Messaging application on her personal computer. Any number of these variables (or others) could be used to reflect Denise's persona.

It should also be noted that the internal structure of endpoints 12a-d are malleable and can be readily changed, modified, rearranged, or reconfigured in order to achieve their intended operations as they pertain to the enhanced caller ID function. As identified supra, software and/or hardware may reside in endpoints 12a-d in order to achieve the teachings of the enhanced caller ID feature of the present invention. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

There are many applications that require the creation and management of a session, where a session is considered an exchange of data between an association of participants. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

SIP currently does not offer conference control services such as floor control or voting and does not prescribe how a conference is to be managed. SIP can be used to initiate a session that uses some other conference control protocol. Since SIP messages and the sessions they establish can pass through entirely different networks, SIP cannot, and does not, provide any kind of network resource reservation capabilities. Quality of service (QoS) parameters may also be accommodated by SIP (e.g., see RFC 3312).

The nature of the services provided make security particularly important. To that end, SIP provides a suite of security services, which include denial-of-service prevention, authentication (both user to user and proxy to user), integrity protection, and encryption and privacy services.

Figure 2:
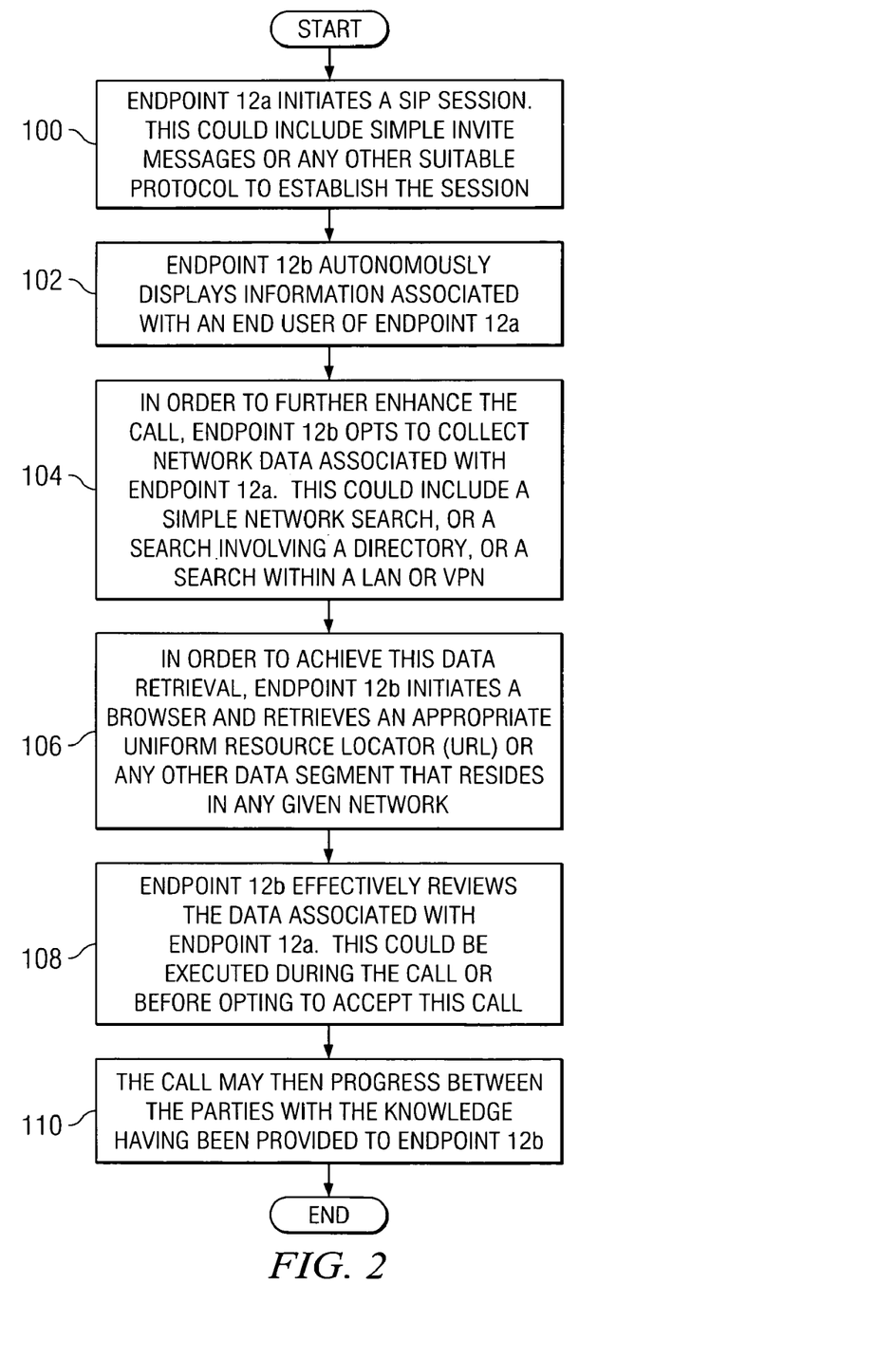
FIG. 2 is a simplified flowchart of an example operational flow of the communication system of FIG. 1.

FIG. 2 is a simplified flowchart illustrating a number of example steps associated with a method to be performed within communication system 10. The flowchart begins at step 100, where endpoint 12a initiates a SIP session. This could include simple invite messages or any other suitable protocol to establish the session. At step 102, endpoint 12b, which is enabled with the new enhanced caller ID function as outlined herein, autonomously displays critical information associated with an end user of endpoint 12a. In order to further enhance the call, endpoint 12b opts to generate network data associated with endpoint 12a at step 104. This could include a simple network search, or a search involving a directory, or a search within a local area network (LAN) or a virtual private network (VPN). (Note that these scenarios are further detailed below with reference to FIG. 3.) In order to achieve the data retrieval, endpoint 12b initiates a browser and retrieves an appropriate uniform resource locator (URL) or any other data segment at step 106. Endpoint 12b effectively reviews the data associated with endpoint 12a: such data augmenting the user experience for an individual associated with endpoint 12b. This could be executed during the call or prior to accepting this call. This is reflected by step 108. Endpoints associated with the call may be continuously replaced or added during the SIP communication session. The call may then progress between the parties with significant knowledge having been properly provided to endpoint 12b, as is illustrated by step 110.

Figure 3:
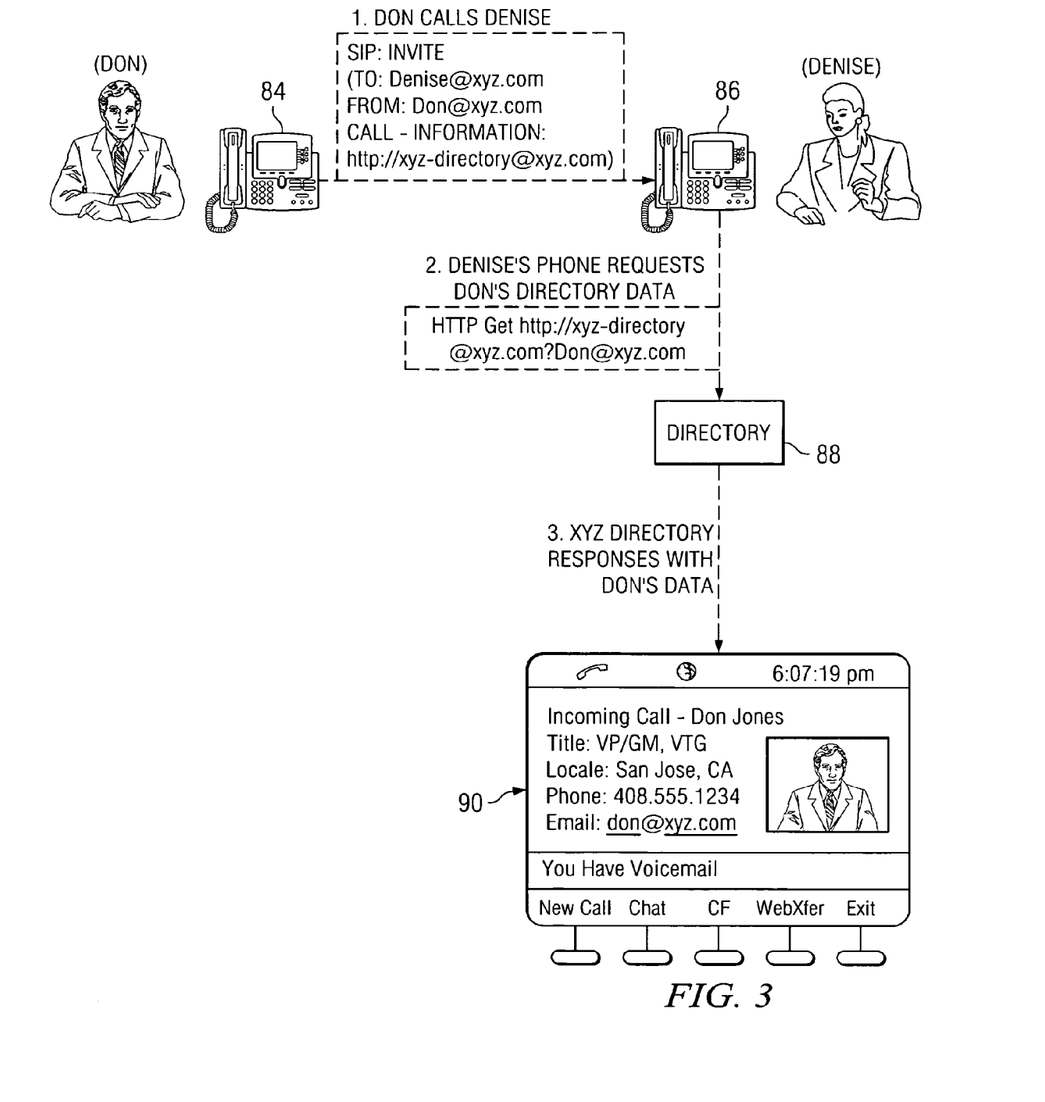
FIG. 3 is a simplified example schematic illustrating an operation of the system of FIG. 1 according to some of the teachings of the invention.

FIG. 3 is a simplified block diagram of an example schematic of communication system of 10 FIG. 1. FIG. 3 includes Don and Denise, who are co-workers communicating with each other using IP telephones 84 and 86. FIG. 3 illustrates a situation in which a call is coming in from Don and destined for Denise. This is illustrated by Step 1 and a simple SIP invite, as depicted. In this example, Denise's device (IP telephone 86) is equipped such that it has the ability to provide the enhanced caller ID function outlined herein. This capability includes the ability to venture out into the network and to collect data. In this example, IP telephone 86 operates as an Internet browser and is capable of querying a directory 88 for selected information, as is shown in Step 2. The query pertains to Don's characteristics, which may include persona information or any other suitable data. Denise's device can then format that information appropriately such that Denise is fully informed of Don's information prior to receiving the call. This retrieved information can be suitably illustrated using a display 90, as depicted in Step 3.

In this example, Don's information includes his title (VP/GM, VTG), his locale (San Jose, Calif.), his phone number 408-555-1234, and his e-mail address (don@ . . . com). Other suitable information could readily be provided in such a context. For example, Don's current sales numbers could be provided here to Denise or the customers for which he is responsible. In addition, directory 88 could include information associated with a reporting chain. Virtually any information associated with a person's identity or character traits can be provided in such an application. As used herein in this document, these parameters may be referred to generally as "identity traits" and inclusive of any number of data segments.

Additionally, Denise's IP telephone 86 is intelligent enough to perform any number of additional tasks. For example, Don could set up a protocol, whereby introductory information is given to any receiving entity of his call. In this example, IP telephone 86 could fetch that information (e.g. a WAV file, a video message, or an audio message, all of which could be stored in some database, etc.) such that it could be suitably reviewed by Denise. The message could indicate: "This is Don, I am calling to review your last quarter's results and the potential for client development. Please be prepared to respond with a list of potential clients that we are seeking to engage." Any suitable message could be provided in such a context.

Other default operations for Denise's IP telephone 84 could be a simple Google (or other equivalent search engine) search for the calling party. The name or identity of the calling participant of the session can be used to explore the network (because SIP is an Internet-capable protocol) for additional data, which may be utilized in the call. Hence, Denise could easily peruse all of Don's Google results while (or before) proceeding with the call. The applications of such an enhanced caller ID tool are endless. In more basic arrangements, this enhanced caller ID capability could allow a receiving party to: ignore the call, prioritize the call, prepare to take the call, respond to the call in some other fashion (for example using IM), or any other appropriate action as determined by the receiving party. What is critical is to empower the individual, who is on the receiving end of this call, to elect between all of the options. In this sense, the receiving entity (Denise in our example) is knowledgeable about the incoming call and its associated calling party. This allows for the subsequent interaction between these parties to be most productive.

In other examples, caller preferences can be used: caller preferences that are provided for in the SIP protocol. For example, when Denise calls Bob (a friend) he can see her picture, her calendar for today, etc. However, when Denise calls her boss, she would rather her boss not see her calendar for obvious reasons.

Note that the benefits of the enhanced caller ID feature can be achieved by a single person or endpoint in cases where the contacting endpoint is using a standard analog telephone. The person invoking this feature can still ascertain the identity of the calling party. Hence, even in cases where Don uses a traditional telephone set-up, Denise would still be able to identify his relevant characteristics.

It is important to note that the stages and steps in FIGS. 2 through 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing enhanced caller ID functions.

Although the present invention has been described in detail with reference to particular embodiments, it should be understood that various other changes, substitutions, and alterations may be made hereto without departing from the spirit and scope of the present invention. For example, the illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints 12a-d. Using analogous reasoning, the routers and switches illustrated by FIG. 1 may be supplanted by bridges, gateways, or any other suitable devices that are conducive to network communications.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for facilitating a data session in a session initiation protocol (SIP) environment, comprising:
   receiving a solicitation for participation in a SIP communication session for a call from a first endpoint to a second endpoint;
   identifying an identity trait associated with a user of the first endpoint, whereby the identifying of the identity trait is done through invocation of a web browser, wherein web links are included in a call set-up message as part of the solicitation, and wherein the solicitation includes embedded SIP presence information associated with the user of the first endpoint, the SIP presence information comprising a presence availability status for the user of the first endpoint; and
   generating, via a network search engine, a network search associated with the user of the first endpoint that is seeking to contact the second endpoint in order to conduct the SIP communication session.

2. The method of claim 1, wherein:
   generating a network search associated with the user of the first endpoint that is seeking to contact the second endpoint in order to conduct the SIP communication session comprises generating a network search based on the identified identity trait associated with the user of the first endpoint.

3. The method of claim 2, further comprising:
   displaying the results of the network search for the second endpoint.

4. The method of claim 1, further comprising:
   querying a directory for an additional identity trait associated with the user of the first endpoint.

5. The method of claim 4, further comprising:
   providing an introductory message associated with the user of the first endpoint for the second endpoint, wherein the introductory message comprises a selected one of a WAV file, an audio message, a video message, and a text message.

6. The method of claim 1, further comprising:
   participating in the SIP communication session that involves the first endpoint after reviewing the identity trait.

7. The method of claim 1, further comprising:
   inviting one or more additional endpoints to participate in the SIP communication session, wherein one or more additional identity traits associated with the additional endpoints are provided to the second endpoint.

8. The method of claim 1, wherein the identity trait is selected from a group of character traits, the group consisting of:
   a) an employee title associated with the user of the first endpoint;
   b) a telephone number associated with the user of the first endpoint;
   c) an e-mail address associated with the user of the first endpoint;
   d) a reporting chain associated with the user of the first endpoint;
   e) performance data associated with the user of the first endpoint; and f) a photograph associated with the user of the first endpoint.

9. An apparatus for communicating data in a session initiation protocol (SIP) environment, comprising:
a first endpoint operable to receive a solicitation for participation in a SIP communication session that involves a first endpoint and a second endpoint, the first endpoint being further operable to identify an identity trait associated with a user of the second endpoint, whereby the identifying of the identity trait is done through invocation of a web browser, wherein web links are included in a call set-up message as part of the solicitation, and wherein the solicitation includes embedded SIP presence information associated with the user of the second endpoint, the SIP presence information comprising a presence availability status for the user of the second endpoint and wherein the first endpoint is further operable to generate, via a network search engine, a network search associated with the user of the second endpoint that is seeking to contact the first endpoint in order to conduct the SIP communication session.

10. The apparatus of claim 9, wherein the first endpoint operable to generate a network search is further operable to generate a network search based on the identified identity trait associated with the user of the second endpoint that is seeking to contact the first endpoint in order to conduct the SIP communication session.

11. The apparatus of claim 10, wherein the first endpoint is further operable to display the results of the network search for the user of the second endpoint.

12. The apparatus of claim 9, further comprising:
a directory coupled to the first endpoint, wherein the first endpoint is operable to query the directory for an additional identity trait associated with the user of the second endpoint.

13. The apparatus of claim 9, wherein the first endpoint is further operable to provide an introductory message associated with the user of the second endpoint for the first endpoint, wherein the introductory message comprises a selected one of a WAV file, an audio message, a video message, and a text message.

14. The apparatus of claim 9, wherein the first endpoint is further operable to participate in the SIP communication session that involves the second endpoint after reviewing the identity trait.

15. The apparatus of claim 9, wherein the first endpoint is further operable to invite one or more additional endpoints to participate in the SIP communication session, wherein one or more additional identity traits associated with the additional endpoints are provided to the first endpoint.

16. Software for facilitating a data session in a session initiation protocol (SIP) environment, the software being embodied in a computer readable medium and comprising computer code such that when executed by a processor is operable to:
receive a solicitation for participation in a SIP communication session for a call from a first endpoint to a second endpoint;
identify an identity trait associated with the a user of first endpoint, whereby the identifying of the identity trait is done through invocation of a web browser, wherein web links are included in a call set-up message as part of the solicitation, and wherein the solicitation includes embedded SIP presence information associated with the user of the first endpoint, the SIP presence information comprising a presence availability status for the user of the first endpoint; and
generate, via a network search engine, a network search associated with the user of the first endpoint that is seeking to contact the second endpoint in order to conduct the SIP communication session.

17. The software of claim 16, wherein the code operable to:
generate a network search associated with the user of the first endpoint that is seeking to contact the second endpoint in order to conduct the SIP communication session is further operable to generate a network search based on the identified identity trait associated with the user of the first endpoint.

18. The software of claim 16, wherein the code is further operable to:
display the results of the network search for the second endpoint.

19. The software of claim 16, wherein the code is further operable to:
query a directory for an additional identity trait associated with the user of the first endpoint.

20. The software of claim 16, wherein the code is further operable to:
provide an introductory message associated with the user of the first endpoint for the second endpoint, wherein the introductory message comprises a selected one of a WAV file, an audio message, a video message, and a text message.

21. The software of claim 16, wherein the code is further operable to:
participate in the SIP communication session that involves the first endpoint after reviewing the identity trait.

22. The software of claim 16, wherein the code is further operable to:
provide an ability for the user of the first endpoint to elect which endpoints can see the user's information or a subset of their information by using one or more caller preferences.

* * * * *

UNITED STATES PATENT AND TRADEMARK OFFICE
CERTIFICATE OF CORRECTION

PATENT NO. : 7,656,878 B2
APPLICATION NO. : 11/003200
DATED : February 2, 2010
INVENTOR(S) : Caballero-McCann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Thirtieth Day of November, 2010

David J. Kappos
*Director of the United States Patent and Trademark Office*